United States Patent
Pan et al.

(10) Patent No.: US 7,444,132 B2
(45) Date of Patent: Oct. 28, 2008

(54) APPARATUS, AND ASSOCIATED METHOD, FOR FACILITATING DYNAMIC FILTERING OF A RECEIVE SIGNAL

(75) Inventors: Li Pan, San Diego, CA (US); Rakesh Agrawal, San Diego, CA (US)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 10/407,931

(22) Filed: Apr. 4, 2003

(65) Prior Publication Data

US 2004/0198280 A1   Oct. 7, 2004

(51) Int. Cl.
*H04M 11/00* (2006.01)

(52) U.S. Cl. .......................... 455/407; 455/68; 455/69; 455/307; 455/340; 455/260

(58) Field of Classification Search .................. 455/68, 455/69, 307, 70, 575, 260, 340
See application file for complete search history.

(56) References Cited

U.S. PATENT DOCUMENTS

| | | | | |
|---|---|---|---|---|
| 5,109,390 A | * | 4/1992 | Gilhousen et al. | 370/335 |
| 5,263,187 A | * | 11/1993 | Sugawa et al. | 455/245.1 |
| 5,281,931 A | * | 1/1994 | Bailey et al. | 333/17.1 |
| 5,313,657 A | * | 5/1994 | Sakamoto et al. | 455/67.14 |
| 5,499,392 A | * | 3/1996 | Grunwell | 455/260 |
| 5,758,296 A | * | 5/1998 | Nakamura | 455/575.7 |
| 5,903,857 A | * | 5/1999 | Behrens et al. | 702/190 |
| 5,995,817 A | * | 11/1999 | Lubbe et al. | 455/266 |
| 6,341,224 B1 | * | 1/2002 | Dohi et al. | 455/522 |
| 6,567,489 B1 | * | 5/2003 | Glover | 375/376 |
| 6,690,311 B2 | * | 2/2004 | Lundin et al. | 341/120 |
| 6,799,024 B2 | * | 9/2004 | Wang et al. | 455/234.1 |
| 6,961,388 B2 | * | 11/2005 | Ling et al. | 375/267 |

* cited by examiner

*Primary Examiner*—Nay Maung
*Assistant Examiner*—Richard Chan
(74) *Attorney, Agent, or Firm*—Alston & Bird LLP

(57) ABSTRACT

Apparatus, and an associated method, for adaptively controlling filter characteristics of a filter forming part of a receive station, such as a mobile station operable in a cellular communication system. An adaptive parameter unit is provided with signal representations of signals that are to be applied to the filter element. The adaptive parameter unit, responsive to measurement or other analysis of the signal indicia, selects the filter characteristics to be exhibited by the filter. And, the filter characteristics are caused to be selected responsive thereto. Dynamic selection and reselection of the filter characteristics is effectuated in which the response time of the filter is minimized during good signal conditions and increased, to permit increased filter operations, during weak signal conditions.

20 Claims, 2 Drawing Sheets

APPARATUS, AND ASSOCIATED METHOD, FOR FACILITATING DYNAMIC FILTERING OF A RECEIVE SIGNAL

The present invention relates generally to a manner by which to filter a receive signal at a filter that exhibits dynamically alterable filter characteristics. More particularly, the present invention relates to apparatus, and an associated method, by which dynamically to select the filter characteristics to be exhibited by the filter and to adjust the filter characteristics responsive to the selection. The filter characteristics are selected to balance conflicting goals of fast response time and minimization of the possibility of filter error.

When implemented in a cellular communication system, pilot signals received by a mobile station are filtered. The filter characteristics are selected responsive, e.g., to the signal strength of the pilot signals. When the signal strength of a pilot signal is strong, the filter characteristics are selected to increase the frequency response time. And, when the signal strength of the pilot signal is weak, the filter characteristics to analyze more carefully the values of the pilot signals. Dynamic reselection of the filter characteristics is made as signal conditions change.

BACKGROUND OF THE INVENTION

Advancements in communication technologies have permitted the development, and deployment, of many varied types of communication systems by which to effectuate the communication of data. For instance, multi-user radio communication systems are available, and widely used, through which to communicate pursuant to effectuation of a communication service. A cellular communication system is exemplary of a multi-user radio communication system. Voice, and other, data generated during operation of a cellular, as well as other radio, communication systems is communicated upon radio communication channels defined upon portions of the electromagnetic spectrum.

A cellular communication system is deployed through the installation of a network infrastructure with which mobile stations communicate. The network infrastructure is installed throughout a geographical area that is to be encompassed by the communication system. In a conventional deployment, the network infrastructure includes a plurality of spaced apart radio base stations. Groups of the radio base stations are coupled to control devices, sometimes referred to as base station controllers. The control devices operate, amongst other things, to control various functions of the radio base stations with which the control devices are coupled. And, groups of the control devices are, in turn, coupled to mobile switching centers and gateway mobile switching centers (MSC/GMSCs). Switching, and other connection, operations are performed by such entities to effectuate communication of data with external networks.

Each radio base station defines a geographical area, referred to as a cell, and from which a cellular communication system derives its name. A cell is a portion of the geographical area encompassed by the cellular communication system, positioned proximate to a radio base station. During normal operation of the cellular communication system, a mobile station is able to communicate with the base station that defines the cell in which the mobile station is located.

The frequency bandwidth allocated for communications in a cellular communication system is efficiently utilized. Due to the positioning of the radio base stations at the spaced positions throughout a geographical area, only relatively power signals need to be generated to effectuate communications between a mobile station and a radio base station. The same channels can thereby be reused by different ones of the radio base stations. A cell reuse plan is utilized to allocate channels to different ones of the radio base stations in a manner to minimize interference between concurrently used channels.

Due to the inherent mobility of a mobile station, and the use of relatively low powered signals to effectuate communications between a radio base station and a mobile station, the mobile station might not be able to continue to communicate with a radio base station with which communications are initiated. More particularly, as a mobile station passes from cell to cell, the mobile station must communicate with successive ones of the radio base stations. Communications with the mobile station continue, thereby, as the mobile station passes through the successive cells defined by the successive ones of the base stations.

Transfer of communications with the mobile station from one radio base station to another is referred to as a communication handoff, or handover. The radio base station from which the communications are banded off is referred to as a serving, or active, cell site, and the base station to which communications are at least potentially to be handed off is referred to as a target cell site. Handover of communications and the procedures leading up to the handover of communications is a fairly complex procedure. Determinations must be made that a handover should occur and a determination to which radio base station to which to handover communications must also be made.

In a cellular communication system that utilizes code division multiple access (CDMA) techniques, a procedure, referred to as a soft handoff, is performed to effectuate handover of communications from a serving cell site to a target cell site. In a soft handover procedure, communications are handed off from a serving cell site to a target cell site without need for the mobile station to retune to a different channel. In other cellular communication systems, hard handoffs are performed in which the mobile station tunes to a different channel pursuant to the handoff of communications.

In any handover procedure, and particularly in a soft handover procedure performed in a CDMA communication system, measurements are made at the mobile station to determine whether a handoff of communications is needed. In a CDMA communication system, for instance, pilot signals are broadcast by the radio base stations. Separate ones of the radio base stations transmit separate pilot signals. The mobile station monitors the pilot signals transmitted by the active cell site as well as one or more potential target cell sites. Measurements are taken of signal indicia associated with the pilot signals. And, responsive thereto, decisions are made whether to initiate handover procedures. In order to maintain the correct base stations for soft handoffs, timely and accurate estimation of the signal strengths, or other indicia of the pilot signals, when detected by the mobile station, must be made. And, decisions related to whether to drop a base station from a soft handoff analysis as a potential target base station, an erroneous decision should not be made due to measurements made during deep fading conditions.

The receive circuitry of the mobile station includes various circuit elements through which representations of the received pilot signals are passed during receive circuitry operations. A filter element is amongst the elements of the receive circuitry that operates upon the representations of the pilot signals monitored by, and operated upon, the receive circuitry during its operation. The filter element exhibits a filter response time that is related, amongst other things, to its gain.

There is a need, however, quickly to make handoff decisions, a filter exhibiting a lengthy response time is contrary to the ability the quick decisions. However, during poor signal conditions, such as during deep fading conditions, a fast response time, and associated small filter gain, does not adequately permit measurement of the pilot signal indicia.

If a manner could be provided by which dynamically to select the filter characteristics of the filter element, improved handover procedures would be possible. When signal conditions are good, a decreased response time of the filter element would be selected to optimize the speed of operation of the receive circuitry pursuant to the handover analysis procedure. And, when signal conditions are poor, the filter characteristics of the filter element would be selected to increase the gain of the filter to permit a more lengthy analysis of the pilot signal indicia.

It is in light of this background information related to filter element selection in a receive circuit of a communication station operable in a cellular, or other radio, communication system, that the significant improvements of the present invention have evolved.

SUMMARY OF THE INVENTION

The present invention, accordingly, advantageously provides apparatus, and an associated method, by which to filter a receive signal at a filter that exhibits dynamically alterable filter characteristics.

Through operation of an embodiment of the present invention, a manner is provided by which dynamically to select the filter characteristics to be exhibited by the filter. And, once the filter characteristics are selected, the filter characteristics are adjusted responsive to the selection. The filter characteristics are selected to balance conflicting goals of fast response time and to minimize the possibility of filter error.

In one aspect of the present invention, pilot signals are generated during operation of radio base stations of a cellular communication system. A mobile station operable in the cellular communication system monitors the pilot signals generated by selected ones of the radio base stations. Responsive to signal indicia of the pilot signals, such as the signal strengths thereof, the filter characteristics of the filter are selected.

Dynamic selection and reselection of the filter characteristics is made responsive to the changing filter conditions. When the signal indicia of a pilot signal improves, the filter characteristics of the filter are selected to decrease the filter response time, thereby more speedily to filter the pilot signals that are applied to the receive circuitry. By reducing the response time of the filter, measurement of the signal indicia of the pilot signals is performed more quickly. And, handover decisions, as well as, also, decisions to drop a base station from consideration as a potential target base station, also are made more quickly.

When signal conditions deteriorate, in contrast, the filter characteristics are selected to increase the response times and corresponding gain, of the filter, thereby to facilitate improved recovery of the signal indicia of the signal. An erroneous decision to drop a base station as a potential target base station erroneously is reduced as the decision is based upon a more studied analysis of the available data.

Thereby, when the signal strength, or other indicia of a base station is relatively strong, timely estimates of the signal strengths, or other indicia of the pilot signals, or other signals, are made. And, when the pilots signals of a radio base station are weak, the response time of the filter is increased, better to facilitate the accuracy of values obtained therefrom and decisions, e.g., to include or to disinclude a radio base station as a potential target cell site is more likely not to be erroneously made.

In another aspect of the present invention, a parameter adjuster is coupled to receive indications of signal strengths of pilot signals detected by a mobile station operable in a cellular communication system. Responsive to the signal strength levels, the parameter adjuster selects a cutoff frequency to be exhibited by filter circuitry forming part of the receive circuitry of the mobile station. And, once the cutoff frequency of the filter is selected, the filter characteristics are adjusted to correspond with the selected cutoff frequency.

The filter element is, for example, an impulse response (IR), implemented as a finite impulse response filter or an infinite impulse response filter. And, the cutoff frequency is translatable into poles of the impulse response filter. That is to say, the cutoff frequency selected by the parameter adapter is defined in terms of filter pole values. Such values are applied to the impulse response filter, and the filter characteristics exhibited by the filter are caused to be responsive thereto. The parameter adjuster forms an adaptive control unit thereby that controls the filter characteristics of the linear filter based upon the input signal quality of signals applied thereto. Dynamic filter characteristic selection and implementation is thereby provided. As the signal conditions of the signals applied to the filter element change, the filter characteristics of the filter correspondingly change, thereby best to provide a balance between fast response time and accuracy of results. Handoff decisions, including decisions whether to continue to consider a particular cell site as a potential target cell are provided.

In these and other aspects, therefore, apparatus, and an associated method, is provided for a radio communication system. The radio communication system has a first communication station that at least receives send signals sent thereto by at least a first send station upon a channel susceptible to non ideal communications. A filter element forming part of the first communication station is caused to exhibit selected filter characteristics. A parameter adjuster is adapted to receive indications of the communication conditions of the channel upon which the send signals are sent. The parameter adjuster selects a value of a parameter defining a filter characteristic of the filter element. The value selected by the parameter adjuster is used to filter the send signal at the filter element within a selected response time and at a selected quality level. The value of the parameter selected by the parameter adjuster is applied to the filter element to cause the filter element to exhibit the selected filter characteristics.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
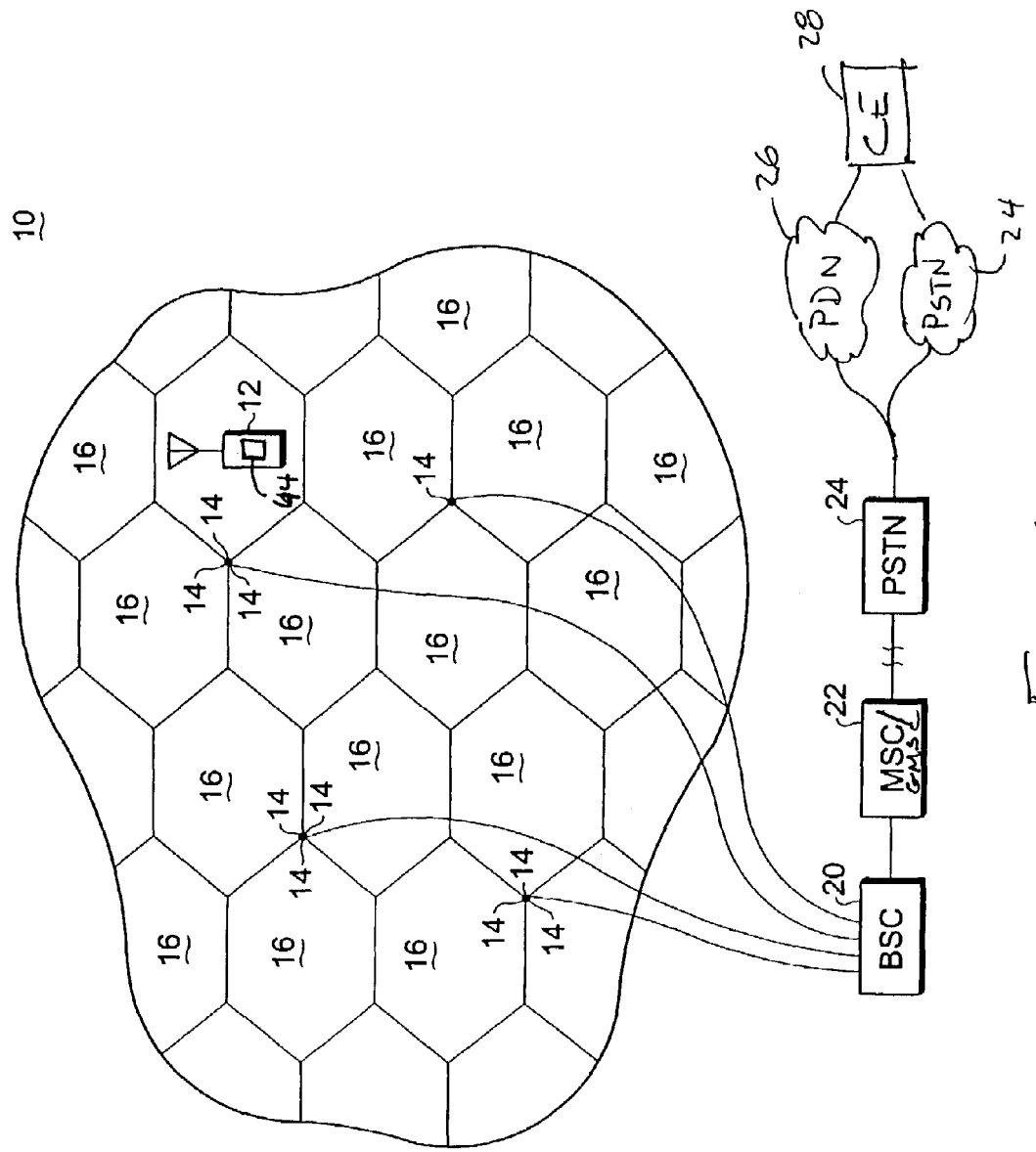
FIG. 1 illustrates a functional block diagram of a communication system in which an embodiment of the present invention is operable.

Referring first to FIG. 1, a portion of a cellular communication system, shown generally at 10, is installed over a geographical area and operates to provide radio communication services with mobile stations positioned within the geographical area. In the exemplary implementation, the cellular communication system utilizes a CDMA (code division multiple access) communication scheme such as that described in the operating specification of the CDMA 2000 system and the operating protocols set forth therein. The communication system 10 is also representative of, however, other types of cellular, and other radio, communication systems. Accordingly, while operation of an embodiment of the present invention shall be described with respect to its implementation in a CDMA based cellular communication system, in other implementations, the present invention is operable in other types of cellular, and other, communication systems.

In the exemplary implementation, the communication system forms a multi user communication system having a plurality of mobile stations operable concurrently therein pursuant to a plurality of communication sessions. An exemplary mobile station 12 is shown in the Figure. Other mobile stations can analogously be represented. The mobile station is permitted operation as part of the communication system pursuant to a service subscription. That is to say, a user of the mobile station subscribes to service in the communication system, and, pursuant to the service subscription, telephonic communications are permitted between the mobile station and a network portion of the communication system.

The network part of the cellular communication system includes a plurality of spaced apart radio base stations 14. The radio base stations are positioned at selected, spaced intervals throughout the geographical area that is encompassed by the communication system. The radio base stations are fixed site radio transceivers, capable of two-way communications with mobile stations by way of a radio air interface defined therebetween. In the exemplary implementation shown in the Figure, groups of radio base stations 14 are co-located. Three radio base stations are positioned together, each defining a sector cell extending in radial directions from the respective radio base stations of 120 degree sectors, each defining a sector cell 16. The cells 16 are represented to be hexagonal in configuration.

The base stations of one or more groups of the radio base stations are coupled to a base station controller (BSC) 20. The base station controller operates, amongst other things, to control operation of the radio base stations that are coupled thereto. Groups of the base station controllers are, in turn, coupled to a mobile switching center (MSC)/gateway mobile switching center (GMSC) 22. The MSC/GMSC operates, amongst other things, to perform switching and connection operations by which to form a communication path that extends to external networks, here a PSTN (public switched, telephonic network) 24 and a packet data network (PDN) 26. A correspondent entity (CE) 28 is coupled to the networks 24 and 26. The correspondent entity is representative of a data source or data sink at which data communicated during operation of the communication system is originated or terminated.

When a communication service is effectuated with a mobile station, such as a telephonic call placed to, or originated at, the mobile station, the mobile station generally communicates with the radio base station in whose cell the mobile station is initially positioned. The radio base station with which the mobile station communicates is sometimes referred to as a serving cell or serving cell site. Due to the inherent mobility of a mobile station, however, the mobile station might travel beyond the cell boundary of the cell defined by the serving cell site. That is, the mobile station might travel out of the cell serviced by the serving cell and enter a cell serviced by another radio base station. The associated radio base station is referred to as a target cell site to which communications are handed off to permit continued communications with the mobile station.

Pilot signals are generated by the respective base stations. And, the mobile station monitors the pilot signals broadcast by various ones of the radio base stations. The mobile station utilizes, for instance, a neighbor cell list in the decisions of which of the pilot signals are monitored. Signal indicia, such as signal strength levels, of the pilot signals are monitored. Responsive to analysis of the monitored pilot signals, decisions are made whether to hand over, or not, communications to a target cell site. As several pilot signals are typically monitored, more than one target cell site is considered, and such cell sites are sometimes referred to as being potential target cell sites.

Monitoring of the pilot signals generated by the selected by the radio base stations requires relatively speedy operation of the receive circuitry of the mobile station. The mobile station must tune to the different channels upon which the different pilot signals are broadcast, analyze signal indicia associated with the pilot signals, and make determinations responsive to the analysis of the measured signal indicia of the various pilot signals. The operations must not only be quickly performed but, also, be accurately performed. An inaccurate determination might result in a base station being incorrectly being removed from the set of potential target cell sites. Or, an erroneous handover decision might be made. When the pilot signal is of strong signal strength, or other analogous characteristic, such as a high signal to noise ratio (SNR), the likelihood of correct analysis of the signal indicia thereof and corresponding handover decisions based thereon is fairly high. Conversely, when the signal strength, or other signal indicia, is poor, the likelihood of accurate decisions based upon analysis of the signal and its associated signal indicia is lessened.

The receive circuitry of the mobile station includes a filter element whose filter characteristics are, in part, determinative of the speed at which the pilot, or other, signals can be monitored and analyzed and also the probability of accuracy of such determinations. An apparatus, shown generally at 44, provides for dynamic selection of filter characteristics to be exhibited by the filter and implementation of a filter exhibiting such dynamically selected characteristics. The filter characteristics are selected responsive to the signal indicia of the signal applied to the filter element, thereby to permit the filter element to be optimized, best to operate upon the signal of specific signal characteristics applied thereto. As signal conditions change, the filter characteristics of the filter are dynamically reselected and the filter characteristics are dynamically caused to be changed corresponding to the reselection.

Figure 2:
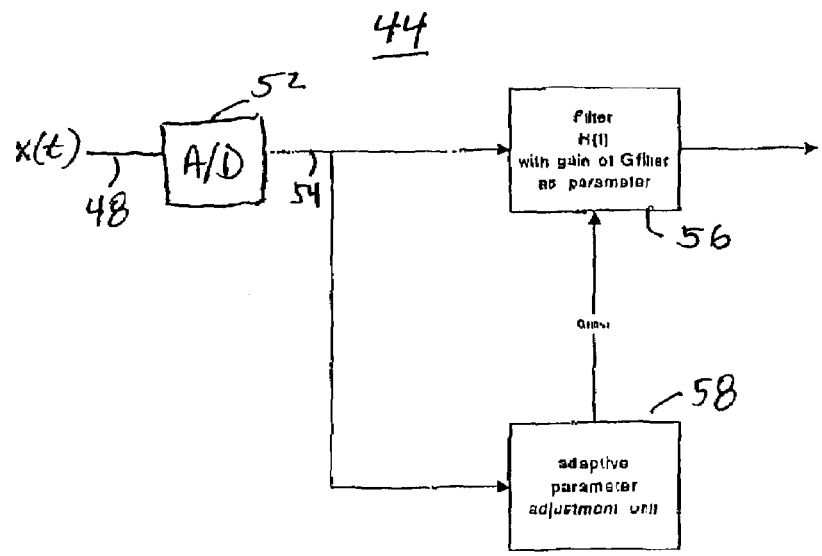
FIG. 2 illustrates a functional block diagram of a portion of the mobile station that forms part of the communication system shown in FIG. 1 and of the apparatus of an embodiment of the present invention.

FIG. 2 illustrates the apparatus 44 of an embodiment of the present invention that forms a portion of the mobile station 12 shown in FIG. 1. The apparatus 44 is represented in functional form and is implemented in any desired manner, such as, for instance, by algorithms executable by processing circuitry. The apparatus is placed in line with the receive circuitry of the mobile station. Other portions of the receive circuitry are not shown, but are conventional in nature. During monitoring operations, the mobile station tunes to various channels to detect various pilot signals generated thereon. Representations of the pilots signals are generated on the line 48 and are sampled by a signal sampler 52. Sampled values of the representations of the pilots signals are generated on the line 54 and are applied to a filter element 56 and also to an adaptive parameter adjustment unit 58.

The filter element 56, in the exemplary implementation, is a linear filter that exhibits an impulse H(t). The filter is constructed to give advantage to the desired signal and also to reduce noise levels, such as a bandpass filter for a bandpass limited signal including white noise. The filter element exhibits a gain of G. And, the representations provided to the filter are characterized, in part, by a signal to noise ratio. Because of the linearity of the filter, if the signal to noise ratio of the values applied thereto are increased by a factor of alpha, then the signal to noise ratio of the filtered representation also increases by a factor of alpha. But, if the signal to noise ratio requirement of the output is not changed, a faster response time is achievable in the reduction in the gain of the filter.

When the signal strength of a pilot signal broadcast by a radio base station, when detected at the mobile station is strong, the likelihood of dropping the base station associated therewith from the active set of potential target cell sites is not significant. The goal when the signal strength is strong is to obtain a correct and timely estimate of the signal indicia associated with the representations of the pilot signal. Conversely, when the signals are of poor quality, such as of low signal to noise ratios, primary effort must be made to ensure that the correct decisions are made with respect to whether to drop a base station from an active set of potential target cell sites.

To perform the T_Comp soft handoff, the correct estimate of the base station strength is required as soon as possible for a given probability of a false alarm. Analogously, a correct estimate of the signal strengths of the pilot signals, as detected by the mobile station, is required for a correct decision to be made to add, or to drop, a base station from a soft handoff selection procedure. The filter element preferably exhibits a fast response time when the signal is a strong and a more careful decision is made when the signal is a weak signal.

The effect of the noise component of the signal representations applied to the filter element results in a lower variance when the signal is strong than when the same noise value forms a component of a relatively weaker signal. The adaptive parameter adjustment unit of an embodiment of the present invention operates to change the parameter of the filter, i.e., the filter characteristics, to increase the response time and to reduce the noise rejection aspect of the filter in a strong signal, low variance condition. Conversely, the adaptive parameter adjustment unit changes the parameters of the filter, i.e., the filter characteristics to increase the noise rejection capacity of the filter, thus resulting in an increased response time. The signal forming the input signal to the filter is the sum of a desire signal x(t) and a noise component n(t). And, the filter output is y(t). Also, y(t) is the convolution of the input signal and the response of a linear filter that exhibits an impulse response of H(t), i.e.:

$y(t)=H(t)*(x(t)+n(t))$

The desired filter output should exhibit a quality metric, such as the probability of the filter making an erroneous decision. The probability of a false decision and mis-detection are both functions of the signal to noise ratio, e.g., the amplitude of the desired signal over the variance of the noise, in an AWGN (average white Gaussian noise) system. The probability of error for a false maximum likelihood decision is:

$P_{error}=erfc(SNR/(2)^{1/2})$ wherein erfc is the complementary error function.

In general, for an AWGN system, the probability of error is a function of the signal to noise ratio. The quality of the estimated signal is, e.g., the signal to noise ratio of the estimated signal, i.e., the variance of the signal compared to the signal amplitude.

The desired goal is to achieve a desired quality within a minimal response time. In general, the response time is directly proportional to the estimate quality. That is to say, the response time is the cost of achieving a higher quality estimate. When a high quality estimate is required, additional time must be taken to perform the estimate. In implementations in which the filter forms a finite impulse response (FIR) or infinite impulse response (IIR) filter system, the output quality is a function of input quality given a particular filter.

The ratio of the output quality relative to the input quality is substantially constant for a linear filter. If the desired quality of the output of the filter is a function of the signal amplitude $Q_o(x)$, and the input signal quality is $Q_i(x)$, then the desired filter gain of the filter is the ratio of the respective output to input qualities. In many systems, however, the output quality is constant and not a function of x. Therefore, the gain of the filter, G, can be set to $Q_o/Q_i(x)$, and the quickest response time is achievable for a given quality requirement.

If the input signal x(t) is sampled with a noise term, controlled to be a constant, then x(n) is the sampled representation thereof. And, the filter gain is estimated using the input signal. The gain of the filter is defined as:

$G=SNR_{output}/SNR_{input}$ wherein the input ratio is the signal to noise ratio of the input signal over the sampling period, and the output ratio is the signal to noise ratio of the output signal formed by the linear filter.

The gain of the filter is set as:

$G=Q_{desired}/kx(n)$ wherein k is a constant factor. The gain of the filter thereby is inversely proportional to the sampled input value. And, the gain of the filter can also be shown to be equal to the desired gain over the noise gain wherein the desired gain is the gain of the desired signal through the linear filter and the noise gain is the gain of the desired signal through the linear filter and the noise gain is the gain of the noise through the filter.

By way of an example, the filter is, for instance, a low pass filter that exhibits a design parameter cutoff frequency $f_{co}$ and the noise is band limited to N*BW, then the value of the gain of the filter is represented by:

$G=1/f_{co}/BW_{noise}$ and $f_{co}=BW_{noise}/G.$

The cutoff frequency of the filter can be translated into the poles of an IIR filter. The response time of the filter is directly related to the cutoff frequency. That is to say, at higher cutoff frequencies, faster response times are provided.

Thereby, through operation of the adaptive unit, the filter characteristics, such as the cutoff frequency of the filter is selectable to control the response time of the filter as well as other characteristics of its operation.

Figure 3:
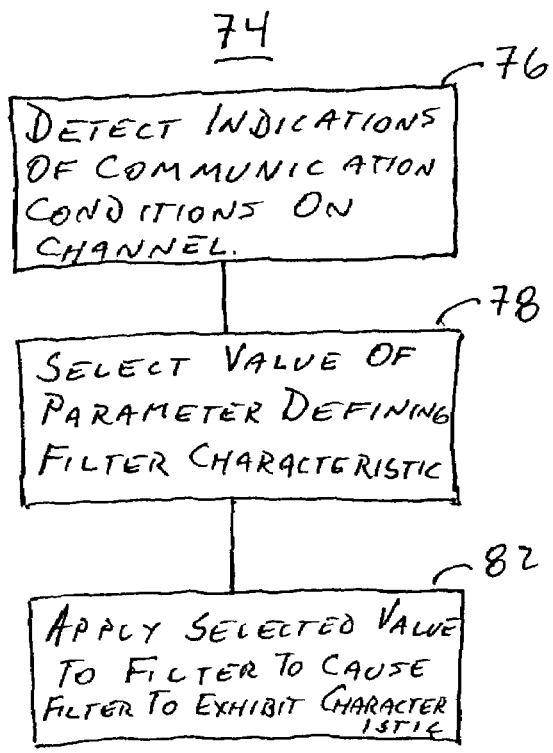
FIG. 3 illustrates a method flow diagram listing the method steps of the method of operation of an embodiment of the present invention.

FIG. 3 illustrates a method flow diagram listing the method of operation of an embodiment of the present invention. The method causes a filter element forming part of a first communication station, such as a mobile station, to exhibit selected filter characteristics. The method is shown generally at 74.

First, and as indicated by the block 76, indications of communication conditions of a channel upon which send signals are sent to the communication station are detected.

Thereafter, and as indicated by the step 78, a value of a parameter defining a filter characteristic of the filter element is selected. The selection is made responsive to indications of the communication conditions that are detected. The values that are selected are used to cause filtering of the send signal at the filter element within a selected response time and at a selected quality level. And, as indicated by the block 82, the value of the parameter is applied to the filter element to cause the filter element to exhibit the selected filter characteristics.

As signal conditions change, the selected parameter correspondingly changes, and the filter characteristics are correspondingly also changed. Dynamic selection and reselection of the filter characteristics is thereby provided in which the selection and reselection procedures are iteratively performed.

When implemented at a mobile station that tunes to pilot signals pursuant to handoff procedures, quick determination of pilot signal parameters are made when signal conditions are good, and more in depth analysis of the signal indicia is made when signal conditions are poor.

The previous descriptions are of preferred examples for implementing the invention, and the scope of the invention should not necessarily be limited by this description. The scope of the present invention is defined by the following claims:

We claim:

1. In a radio communication system having a first communication station that at least receives send signals sent thereto by at least a first send station upon a channel susceptible to non-ideal communication conditions, an improvement of apparatus for causing a filter element forming part of the first communication station to exhibit selected filter characteristics, said apparatus comprising:
   a parameter adjuster adapted to receive indications of the communication conditions of the channel upon which the send signals are sent, said parameter adjuster for selecting a value of a parameter defining a filter characteristic of the filter element, the value selected by said parameter adjuster used to filter the send signal at the filter element within a selected response time and at a selected quality level, the value of the parameter selected by said parameter adjuster applied to the filter element to cause the filter element to exhibit the selected filter characteristics,
   wherein a signal to noise ratio is associated with the send signals received at the first communication station and said parameter adjuster receives indications of the send signal comprising send signal amplitude related values,
   wherein the send signal amplitude related values that said parameter adjuster receives comprise signal to noise ratio values, the value selected by said parameter adjuster responsive to the signal to noise ratio values of the send signal.

2. The apparatus of claim 1 wherein the radio communication system comprises a cellular communication system, wherein the first communication station comprises a mobile station, wherein the first send station comprises a base station, and the send signals comprise pilot signals, and wherein said parameter adjuster receives indications of the pilot signal subsequent to communication thereof upon the channel, the indications of the pilot signals representative of the communication conditions of the channel.

3. The apparatus of claim 2 wherein the indications of the pilot signals that said parameter adjuster receives comprise the send signal amplitude related values.

4. The apparatus of claim 1 wherein the selected filter characteristics comprise both a filter response time and an accuracy probability, and wherein the value selected by said parameter adjuster is of a value that balances the filter response time and the accuracy probability.

5. The apparatus of claim 1 wherein the filter element is defined, at least in part, by a filter cut off frequency, and wherein the value selected by said parameter adjuster is determinative of the filter cut off frequency of the filter element.

6. The apparatus of claim 5 wherein the filter element comprises a Finite Impulse Response (FIR) filter and wherein the value selected by said parameter adjuster is determinative of at least a first filter pole of the Finite Impulse Response filter.

7. The apparatus of claim 5 wherein the filter element comprises an Infinite Impulse Response (IIR) filter and wherein the value selected by said parameter adjuster is determinative of at least a first filter pole of the Infinite Impulse Response filter.

8. The apparatus of claim 5 wherein the value selected by said parameter adjuster causes increase in the filter cut off frequency when the indications of the communication conditions indicate the communication conditions upon the channel to be deteriorating beyond a selected threshold.

9. The apparatus of claim 5 wherein the value selected by said parameter adjuster causes decreases in the filter cut off frequency when the indications of the communication conditions indicate the communication conditions upon the channel to be improving beyond a selected threshold.

10. The apparatus of claim 1 wherein said parameter adjuster receives, at least at successive intervals, indications of the communication conditions, and wherein the value selected by said parameter adjuster is dynamically selected and reselected responsive to the indications of the communication conditions received at the at least the successive intervals.

11. The apparatus of claim 1 wherein the filter element comprises a linear filter element and wherein the indications of the communication conditions that said parameter adjuster receive comprise indications of send signal quality levels.

12. In a method of communicating in a radio communication system having a first communication station that at least receives send signals sent thereto by at least a first send station upon a channel susceptible to non-ideal communication conditions, an improvement of a method for causing a filter element forming part of the first communication station to exhibit selected filter characteristics, said method comprising:
   detecting indications of the communication conditions of the channel upon which the send signals are sent;
   selecting a value of a parameter defining a filter characteristic of the filter element responsive to indications detected during said operation of detecting, the value selected used to cause filtering of the send signal at the filter element within a selected response time and at a selected quality level;
   applying the value of the parameter to the filter element to cause the filter element to exhibit the selected filter characteristics; and sampling, prior to said operation of detecting, the send signals, once received at the first communication station, said operation of sampling iteratively performed.

13. The method of claim 12 wherein the indications detected during said operation of detecting comprise indications of a signal to noise ratio of the send signal.

14. The method of claim 12 wherein the filter element is defined, at least in part, by a filter cut off frequency, and wherein the value selected during said operation selecting is determinative of the filter cut off frequency of the filter element.

15. The method of claim 14 wherein the filter element comprises an Impulse Response (IR) filter and wherein the value selected during said operation of selecting is determinative of at least a first filter pole of the Impulse Response filter.

16. The method of claim 12 wherein the filter element comprises a linear filter element and wherein the indications of the communication conditions detected during said operation of detecting comprise indications of send signal quality levels.

17. The method of claim 12 wherein said operations of detecting, selecting, and applying are iteratively performed.

18. The method of claim 12 wherein the send signals sent by at least a first send station comprises first send signals sent by the first send station and at least second send signals sent by at least a second send station, and wherein said operation of detecting comprises detecting, for each of the first and at least second send signals, the indications of the communication conditions.

19. An apparatus comprising:
a parameter adjuster configured to receive indications of communication conditions of a channel upon which send signals are sent from a first send station to a first communication station, the parameter adjuster being configured to select a value of a parameter defining a filter characteristic of a filter element included in the first communication station, the value selected by the parameter adjuster used to filter the send signal at the filter element within a selected response time and at a selected quality level, the value of the parameter selected by the parameter adjuster applied to the filter element to cause the filter element to exhibit selected filter characteristics,
wherein a signal to noise ratio is associated with the send signals received at the first communication station and the parameter adjuster receives indications of the send signal comprising send signal amplitude related values, and
wherein the send signal amplitude related values that the parameter adjuster receives comprise signal to noise ratio values, the value selected by the parameter adjuster based on the signal to noise ratio values of the send signal.

20. A method comprising:
detecting indications of communication conditions of a channel upon which send signals are sent from a first send station to a first communication station;
selecting a value of a parameter defining a filter characteristic of a filter element included in the first communication station responsive to indications detected during the operation of detecting, the value selected used to cause filtering of the send signal at the filter element within a selected response time and at a selected quality level;
applying the value of the parameter to the filter element to cause the filter element to exhibit the selected filter characteristic; and
sampling, prior to the operation of detecting, the send signals, once received at the first communication station, the operation of sampling iteratively performed.

* * * * *